US012752525B2

(12) United States Patent
Kim

(10) Patent No.: US 12,752,525 B2
(45) Date of Patent: Oct. 6, 2026

(54) FLEXIBLE COVER

(71) Applicant: Dale Kim, Hermosa Beach, CA (US)

(72) Inventor: Dale Kim, Hermosa Beach, CA (US)

( * ) Notice: Subject to any disclaimer, the term of this patent is extended or adjusted under 35 U.S.C. 154(b) by 196 days.

(21) Appl. No.: 18/706,545

(22) PCT Filed: Nov. 1, 2021

(86) PCT No.: PCT/US2021/057560
§ 371 (c)(1),
(2) Date: May 1, 2024

(87) PCT Pub. No.: WO2023/075800
PCT Pub. Date: May 4, 2023

(65) Prior Publication Data

US 2025/0018705 A1 Jan. 16, 2025

(51) Int. Cl.
*B32B 3/18* (2006.01)
*B32B 5/02* (2006.01)
(Continued)

(52) U.S. Cl.
CPC .............. *B32B 37/142* (2013.01); *B32B 3/18* (2013.01); *B32B 5/028* (2013.01); *B32B 5/073* (2021.05);
(Continued)

(58) Field of Classification Search
CPC ......... A47B 2097/003; B29L 2023/001; B32B 3/08; B32B 3/18; B32B 3/22; B32B 5/028; B32B 5/06; B32B 5/073; B32B 5/26; B32B 7/04; B32B 7/08; B32B 7/09; B32B 15/02; B32B 15/06; B32B 15/08; B32B 15/14; B32B 15/18; B32B 15/20; B32B 25/042; B32B 25/14; B32B 25/20; B32B 37/0076; B32B 37/04; B32B 37/06; B32B 37/12;
(Continued)

(56) References Cited

U.S. PATENT DOCUMENTS 4,402,489 A * 9/1983 Murray .................... A62B 1/18 242/157 R
5,901,756 A 5/1999 Goodrich
(Continued)

FOREIGN PATENT DOCUMENTS

CN 1441984 9/2003

OTHER PUBLICATIONS

International Search Report dated Jan. 31, 2022 issued in Application No. PCT/US2021/057560.
(Continued)

*Primary Examiner* — Michael A Tolin
(74) *Attorney, Agent, or Firm* — KED & ASSOCIATES, LLP

(57) ABSTRACT

A flexible covering for any type of object, such as wires, cables, and the like, includes a flexible sleeve in a partially rolled natural state and capable of being unrolled, and at least one pliable rod or insert running through at least a portion of entire length of the flexible sleeve capable of firmly holding the flexible sleeve in a bent shape while allowing the flexible sleeve to remain wrapped around the object. A method for manufacturing the flexible covering includes providing at least two cover layers, and an intermediate pliable layer, and then coupling together the cover layers to at least partially encapsulate the pliable layer.

20 Claims, 9 Drawing Sheets

(51) Int. Cl.

| | |
|---|---|
| ***B32B 5/06*** | (2006.01) |
| ***B32B 5/26*** | (2006.01) |
| ***B32B 7/08*** | (2019.01) |
| ***B32B 25/04*** | (2006.01) |
| ***B32B 37/14*** | (2006.01) |
| ***B60R 16/02*** | (2006.01) |
| ***H01B 7/00*** | (2006.01) |
| *A47B 97/00* | (2006.01) |
| *B29L 23/00* | (2006.01) |

(52) U.S. Cl.

CPC .................. *B32B 5/26* (2013.01); *B32B 7/08* (2013.01); *B32B 25/042* (2013.01); *B60R 16/0207* (2013.01); *H01B 7/0045* (2013.01); *A47B 2097/003* (2013.01); *B29L 2023/001* (2013.01); *B32B 2305/34* (2013.01); *B32B 2305/38* (2013.01); *B32B 2319/00* (2013.01)

(58) Field of Classification Search

CPC ............ B32B 37/1284; B32B 37/1292; B32B 37/142; B32B 2305/10; B32B 2305/34; B32B 2305/38; B32B 2311/00; B32B 2311/005; B32B 2311/12; B32B 2311/24; B32B 2311/30; B32B 2457/00; B32B 2553/00; B60R 16/0207; B60R 16/0215; B65D 65/40; C09J 2203/302; D03D 1/0043; H01B 7/0045; H01B 13/012; H01B 13/01209; H01B 13/01218; H01B 13/01263; H01B 13/01272; H01B 13/01281; H02G 3/04; H02G 3/0406; H02G 3/0443; H02G 3/045; H02G 3/0456; H02G 3/0462; H02G 3/0481; H02G 3/0487; H02G 3/305; H02G 3/34

See application file for complete search history.

(56) References Cited

U.S. PATENT DOCUMENTS

| | | | | |
|---|---|---|---|---|
| 6,124,015 | A | 9/2000 | Baker et al. | |
| 10,770,874 | B2 | 9/2020 | Kim | |
| 2004/0099426 | A1 | 5/2004 | Bryl et al. | |
| 2004/0219846 | A1 | 11/2004 | Sellis et al. | |
| 2012/0011795 | A1 | 1/2012 | Pacione et al. | |
| 2013/0014326 | A1* | 1/2013 | Kane | A47G 9/02 156/227 |
| 2013/0167332 | A1 | 7/2013 | Terada et al. | |
| 2018/0305049 | A1* | 10/2018 | Wetsch | B32B 3/02 |
| 2018/0337520 | A1 | 11/2018 | Kim | |

OTHER PUBLICATIONS

Chinese Office Action dated Jan. 21, 2026 issued in Application No. 202180103967.0.

* cited by examiner (a)

(b)

(a)

(A)

(B)

FLEXIBLE COVER

CROSS-REFERENCE TO RELATED PATENT APPLICATION

This application is a U.S. National Stage Application under 35 U.S.C. § 371 of PCT Application No. PCT/US2021/057560, filed Nov. 1, 2021, the entire disclosures of which is hereby incorporated by reference.

BACKGROUND

1. Field

The present disclosure relates to a flexible covering or sleeve for receiving any type of object.

2. Background

Various forms of coupling and bundling objects, such as wires and cables, together are known in the art, such as tape, twist ties, zip strips, and other pliable coverings. However, shortcomings with each of these tools exist, such as difficulty in adding or subtracting cables or wires from the bundle. Further, the bundle of wires may not be easily manipulated into convenient flexible and fixed positions to reduce clutter or effectively package the bundle in a certain space.

BRIEF DESCRIPTION OF THE DRAWINGS

Embodiments will be described in detail with reference to the following drawings in which like reference numerals refer to like elements, and wherein.

DETAILED DESCRIPTION

A flexible covering or sleeve is described which may partially overlap itself to wrap around a single or multiple wires, cables, rods, or any other objects. Once the objects are wrapped, a user may then bend the covering containing the objects to a predetermined degree as needed for a particular application, at which point the covering may firmly hold the objects in the bent state using one or more pliable rods or wires running through the covering.

Figure 1:
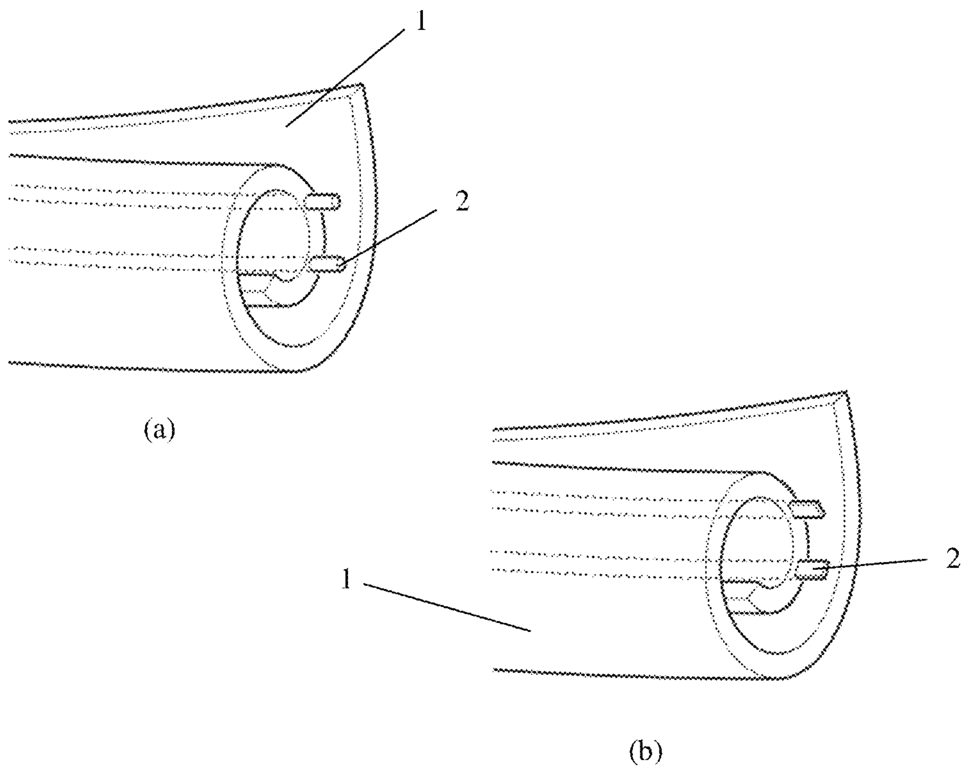
FIG. 1 is a perspective view illustrating (a) an example of inner wires running through a sleeve, and (b) another example of wires running through the sleeve.

As illustrated in FIG. 1, a covering or sleeve 1 may have a rolled shape capable of encasing or wrapping objects, such as a grouping of wires or cables. The covering 1 may be made of a flexible rubber, plastic, silicone or other pliable solid material, which may be non-conducting. The covering 1 may have a certain rigidity to hold a partially rolled form so that edges overlap in a natural state, and may be temporarily unwrapped to insert one or more wires or cables. Once the object, such as one or more wires or cables, are inserted, the covering 1 may revert back to its partially rolled state to encase the objects together. The covering 1 may not need a separate fastening means to enclose the covering 1 in a rolled state.

One or more pliable rods or shafts 2 may be inserted into and run partially or entirely through the length of the covering 1. The rods 2 may be made of pliable metal, but the material is not limited thereto. The rods 2 may be oriented parallel to each other, and may be parallel to edges of the covering 1 or may be oriented to a predetermined degree with respect to the edges of the covering 1.

Once the one or more objects, such as wires or cables, are inserted, the user may bend the covering 1 to a predetermined degree. The pliable rods 2 may hold the covering in the bent position. The covering 1 may be rigid enough to keep the one or more objects, such as wires or cables, enclosed within the covering 1 even when the covering 1 is in the bent position.

The covering 1 may be electrically insulating and may have low thermal conductivity, i.e., high thermal resistance. The rods 2, which may be flat or rounded, may be embedded inside the covering 1, or in between two layers of the covering material to keep them enclosed. Although only two rods are shown, additional rods may be provided. The rods 2 may also have any cross section to allow for the covering 1 to be maintained in a bent state. Further, a thin sheet or multiple inner wires, rods, or sheets may be used, which may be solid or mesh like.

The covering 1 may allow users to cover or bundle single or multiple wires, cables, cordage, and other similar type objects together and bend them. The rods 2, sheets, or mesh may be embedded in the covering material and may allow the covering 1 to be bendable and hold the position in a wide range of angles. The metal rods 2, sheets, or mesh may have sufficient structural rigidity to allow the covering 1 to maintain its angled shape after bending.

Figure 2:
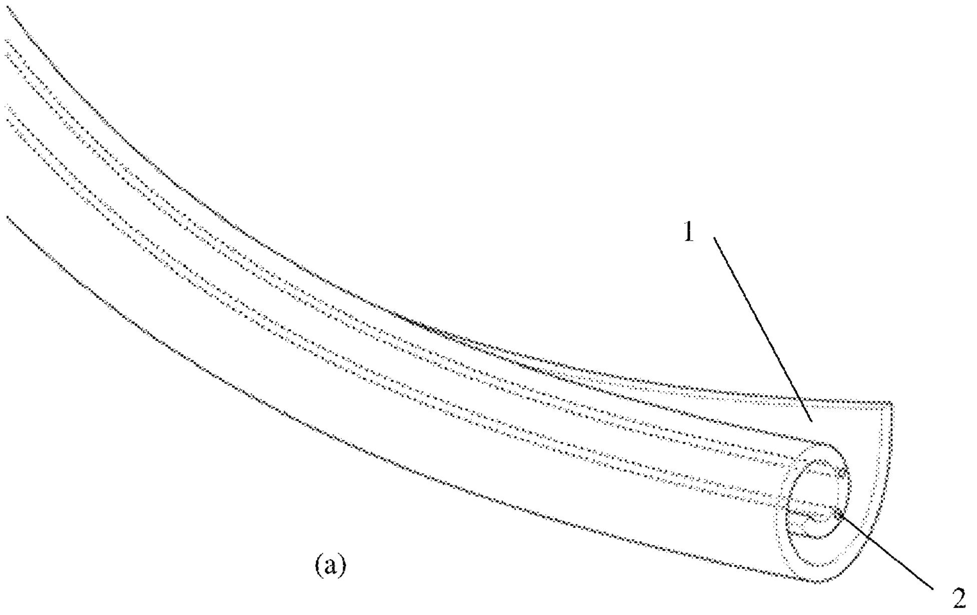
FIG. 2 is a perspective view illustrating (a) an elongated version of the sleeve, and (b) another example of the sleeve.
Figure 2:
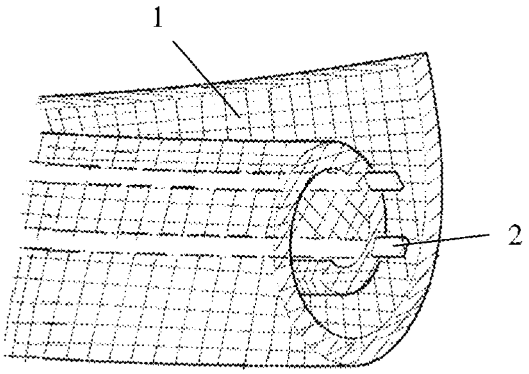

As illustrated in FIG. 2, the covering 1 may be manufactured in pre measured lengths, and may further be cut to size depending on usage requirements. The ends of the pre-cut sections may be enclosed so the inner reinforcing rod 2, mesh, or sheet is not exposed. Although metal material may be generally used for the rods 2, other types of pliable materials may be used as long as the materials maintain sufficient rigidity after bending into a prescribed shape.

The covering 1 may also be manufactured in a multitude of sizes. For example, the covering 1 may be used in multiple applications, such as a home or office, an automobile, general building construction, or suspended telephone cables. Additional rods 2 may be inserted as necessary to ensure stability when a bending is applied to the covering 1. The additional rods 2 may be inserted at any angle with respect to the first rods 2.

Although the attached figures illustrate the covering 1 being wound around, the covering 1 may be provided where it is partially wound around an object, such as a bundle of wires. In an alternative embodiment, the covering 1 may have a pattern, as shown in FIG. 2, or may be part of the pattern. Although the wires are shown in the figures to be embedded, the wires may be provided on an external surface of the cover. The covering 1 may also be a pliable mesh type, which may allow for bending and stability without the need for additional rods 2 to be inserted through the covering 1.

Figure 3:
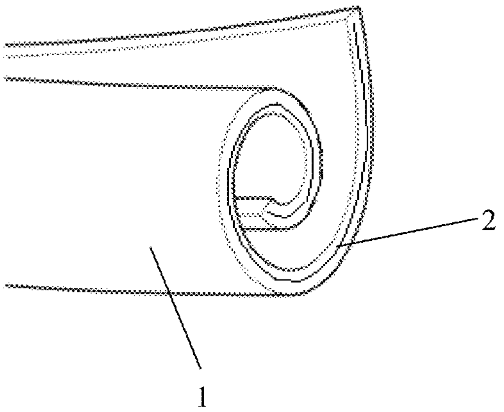
FIG. 3 is a perspective view illustrating (a) an embodiment of a mesh type insert, and (b) an example of the mesh structure.
Figure 3:
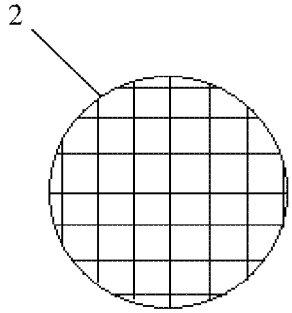

As illustrated in FIG. 3, the insert 2 may be a pliable mesh type that runs through an entire length of the covering 1. The mesh insert 2 may also run through an entire width of the covering 1 in order to improve rigidity. The mesh insert 2 may also only run through a portion of the covering 1 in order to reduce material usage.

Figure 4:
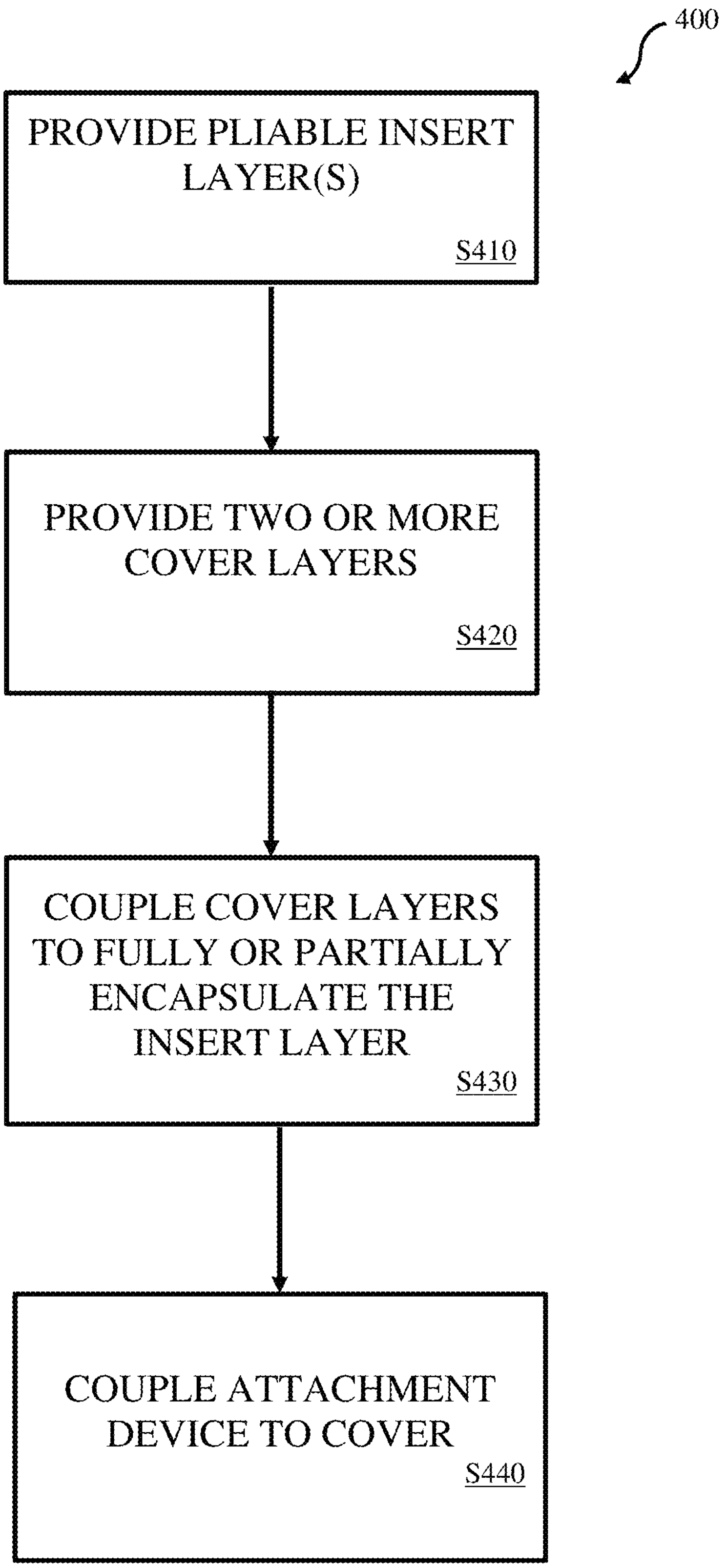
FIG. 4 depicts an example of method for manufacturing a flexible cover in certain implementations of the present application.

As illustrated in FIG. 4, a method 400 for manufacturing a flexible cover in certain implementations of the present application may include providing at least one pliable insert layer (S410), providing inner and outer cover layers on opposite surfaces of the pliable insert layer (S420), and coupling together the cover layers to partially or fully encapsulate the at least one pliable insert layer positioned therebetween (S430). It should be appreciated that method 400 may include additional, fewer, and/or different steps in the manufacturing of the flexible cover. For example, when the flexible cover includes multiple pliable insert layers, method 400 may include additional processing and bonding of pliable insert layers. In other example, additional layers may be provided between pliable insert layer and the cover layers, such as to provide an intermediate shielding, insulation, shaping, or protective layer between the pliable insert layer and at least one of the cover layers. Additionally, while a structure having an outer cover layer, an inner cover layer, and an insert layer between the inner and outer cover layers is discussed in the following examples, it should be appreciated that other structures may be formed for the flexible cover of the present application, such as a flexible cover further including multiple insert layers and at least one intermediate cover layer provided between two or more of the insert layers.

Providing the at least one pliable insert layer in step S410 may include providing a roll of a mesh, wire, or other structure for the pliable insert that is unrolled to a flat form. For example, as previously described, the pliable insert may include one or more pliable rods or shafts 2 that may be made of a metal or other pliable material, and the rods 2 may be oriented parallel to each other, parallel to edges of the covering 1, and/or may be oriented to a predetermined degree with respect to the edges of the covering 1. In another example, the pliable insert may include additional rods 2 that may be inserted at any angle with respect to the first rods 2. In these examples, the rods 2 may be provided on some type of connecting material, such as a fabric that holds the rods at desired orientations and spacing and providing the pliable mesh in step S410 may include unrolling the connecting material with the pliable insert. In another example, the pliable insert may include a pliable mesh, and providing the pliable mesh in step S410 may include unrolling the mesh material into a substantially flat form. In another example, providing the pliable mesh in step S410 may include providing first rods or wires that extend in a first direction, providing second rods or wires that extend in a second direction intersecting the first direction, and then bonding the first and second rods or wires to form the mesh.

Continuing with method 400 in FIG. 4, providing inner and outer cover layers on opposite surfaces of the pliable insert layer in step S420 may include providing a first roll of a first cover layer (e.g., an internal cover layer) and providing a second roll of a second cover later (e.g., an external cover layer) that are unrolled to a flat form. The two or more cover layers may be a same material with similar physical characteristics, a same material with different textures, thickness, or other characteristic, or can be entirely different materials and different textures.

It should be appreciated, however, the at the cover layer provided in step S420 may be chosen to best suit different purposes that may need enhanced properties or characteristics such as but not limited to insulation, heat, conductivity, pliability, and others. For example, as previously described, the layers of covering 1 may be made of a flexible rubber, plastic, silicone or other pliable solid material, which may be non-conducting and may be electrically insulating and may have low thermal conductivity, i.e., high thermal resistance, and the layers of covering 1 may combine to have a certain rigidity to hold a partially rolled form so that edges overlap in a natural state. For example, an internal cover layer (e.g., material to be positioned adjacent to one or more objects, such as cables or wires, to be held in the flexible wrap), may include ridges to orient the held object in a particular direction or may include a deformable padding, such as an aerated foam material, to prevent damage to the received object and provide a more secure hold of the object. At the same time, a second external cover layer(s) may include different materials or structures, such as to include a tacky material to seal the held object(s) when the flexible cover is applied.

Continuing with method 400 in FIG. 4, coupling together the cover layers in step S430 may include sealing the cover layers together with some type of closure like a hook-and-loop connector such as Velcro™, zipper, clasps, snap closures, or similar device. after positioning the pliable insert between the cover layers. In another example, the cover layers may be coupled together using an adhesive or the cover layers may be coupled together through a heating or chemical process to bond together the cover layers.

In connecting with coupling together the cover layers to at least partially encapsulate the at least one pliable insert layer in step S430, one or more of the cover layers or the insert layer may be positioned or trimmed so that single or multiple pliable inserts (rods, flexible panels, sheet sections, etc.) are positioned in between cover layers, and the insert may be sized to extend past the covering layers so that insert is partially exposed when the cover layers are connected or be shorter than the covering layers so that the insert is entirely encapsulated in cover layers when the cover layers are connected together. For example, at least a position of the insert may be exposed to allow the insert to be manipulated and used separate of the cover. For example, an exposed portion of the insert may be bent to separately wrap around a section of an object to be held in the flexible cover. In another example, an exposed portion of the insert may be bent to wrap around another object that is not held in the flexible cover, such as to couple the flexible cover and held object(s) to another object, such as to position and fix the cover and a held object on a pole or other fixture. In another example, coupling together the cover layers together to the pliable insert layer in step S430 may include providing seams between portions of the portions of the flexible insert. For example, if one or more inserts corresponding to rods or wires that extend in a particular direction (e.g., in a length direction of a held object), the seams may also run on the extension direction of the insert, such as to be provided on one or more sides of the insert. For example, if the seams are provided on sides of an extended inserted, the seams may function to partially encapsulate the insert at these sides. The seams may be formed, for example, by sewing, gluing, bonding, together the inside and exterior cover layers, or using some type of closure like a hook-and-loop connector, a zipper, clasps, snap closures, or similar devices. after positioning the pliable insert between the cover layers. If the insert extends in two or more directions, the seams may also be provided in the two or more directions. For example, if the insert includes a mesh formed as a mesh with wires that extend in two inserting directions, seams may be provided parallel to the wires of the mesh. Thus, the seams may be used to secure the positioning of the mesh or other insert and to prevent movement of insert relative to the cover even as the flexible covering is being unfolded to receive an object, folded to secure the object, or bent to position and shape the held object and covering.

Continuing with method 400 in FIG. 4, an attachment device (to be discussed below with respect to FIG. 9) may be coupled to the cover (step S440). For example, the secondary attachment device, such as a clamp, brace, band, clasp, etc. that may be used to attach the flexible cover and an object held therein to another object, may be coupled to an outer surface of the outer cover layer. The attachment device may be permanently attached to the flexible cover using an adhesive, sewing, bolt, connector, etc. or may be coupled together through a heating or chemical process to bond attachment device to the cover Alternatively, the attachment device may be removably coupled to the flexible cover with some type of semi-permanent connection such as hook-and-loop connector, zipper, clasps, snap closures, or similar devices.

Figure 5:
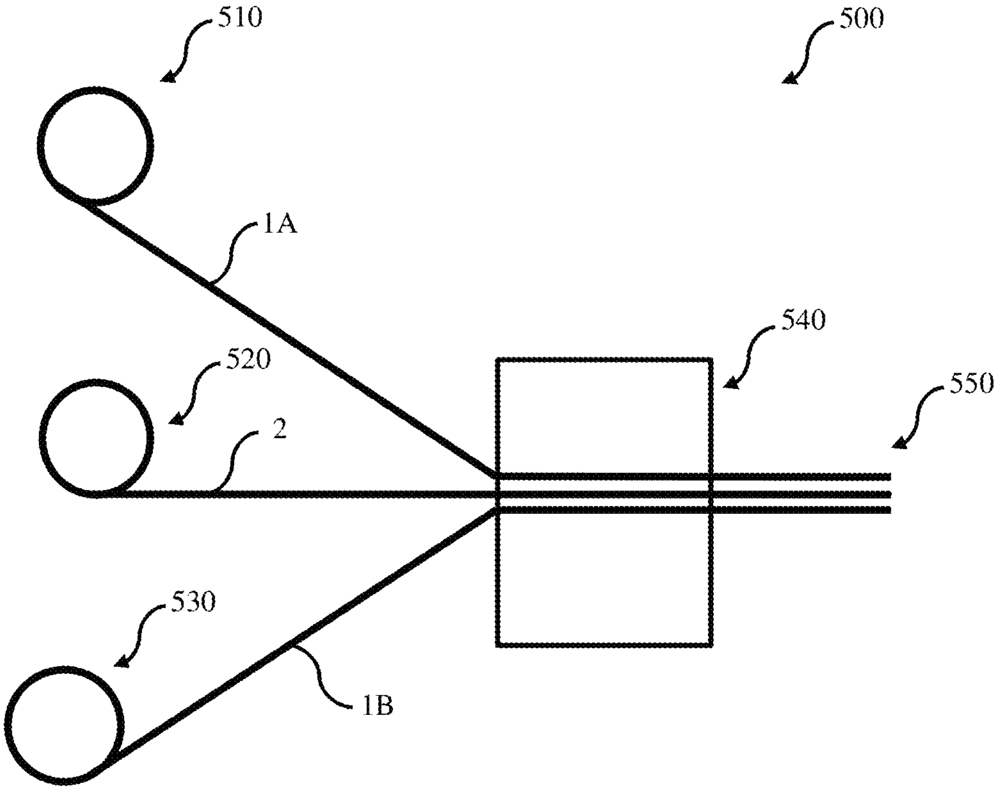
FIG. 5 depicts an example of a device for manufacturing a flexible cover in certain implementations of the present application.

FIG. 5 depicts an example of a device 500 for manufacturing a flexible cover in certain implementations of the present application. For example, device 500 may include a first conveyer line 510 to provide at least one first cover layer 1A (e.g., at least one internal cover layer), a second conveyer line 520 to provide at least one insert layer 2, and a third conveyer line 530 to provide at least one second cover layer 1A (e.g., at least one external cover layer). For example, second conveyer line 520 may provide and flatten the insert layer 2, and the first and third conveyer lines 510, 530 may provide and flatten the first and second cover layers 1A, 1B on opposite surfaces of the insert layer 2. The combination of the first and second cover layers 1A, 1B with the insert layer positioned therebetween may be received in an assembly machine 540 that connects together the first and second cover layers 1A, 1B to at least partially encapsulate the insert 2 in a composited flexible covering 550. For example, as previously described, may assembly machine 540 may seal the cover layers 1A, 1B with some type of closure like a hook-and-loop connector, zipper, clasps, snap closures, or similar devices. after positioning the pliable insert between the cover layers. In another example, assembly machine 540 may include a sealer that couples together the cover layers 1A, 1B using an adhesive or through a heating process to bond the cover layers 1A, 1B.

Assembly machine 540 may further forms seams between adjacent pieces of the flexible insert. For example, the assembly machine 540 may couple together sections of the inner and outer cover layers between sections of the flexible insert to separate the sections of flexible insert and to at least partially encapsulate the portions of the flexible insert. Thus, the seams may improve safety of the flexible cover by electrically separating the portions of the flexible insert such that even if a portion of the flexible insert contacts an exposed wire or other object that is carrying a current, the seams prevent the current from being carried along other portions of the flexible insert. Additionally, the seams electrically isolate a conductive insert layer 2, such as metal wires or mesh, to provide an electrically isolated conductive layer to electromagnetically shield objects held in the flexible cover to block radio waves, electromagnetic fields, and electrostatic fields through the flexible cover.

Figure 6:
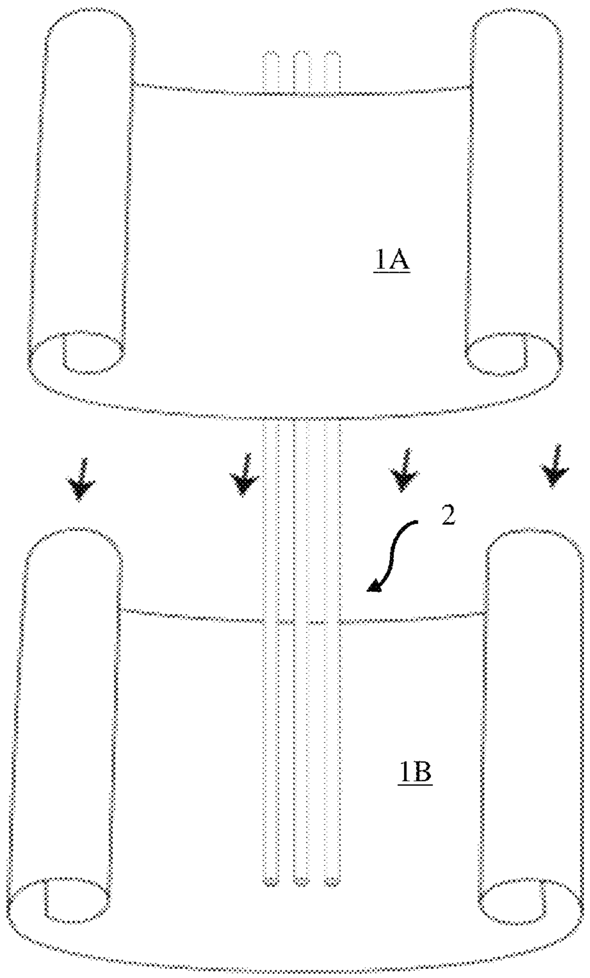
FIG. 6 depicts an example of components of a flexible cover manufactured in certain implementations of the present application according to the method depicted in FIG. 4.

FIG. 6 depicts an example of components of a flexible cover manufactured in certain implementations of the present application according to the method depicted in FIG. 4. For example, at least one first cover layer 1A and at least one second cover layer 1B may be positioned at opposite sides of pliable insert 2. In the depicted example, the pliable insert 2 may include one or more rods that extend in a first direction, and the at least one first cover layer 1A and at least one second cover layer 1B may be positioned so that a resulting cover 1 may have a rolled shape capable of encasing or wrapping an object, such as a grouping of wires or cables. For example, as previously described, the flexible cover may include multiple pliable insert layers, at least one additional layer provided between pliable insert layer and the cover layers, and/or at least one intermediate cover layer provided between two or more of the insert layers.

Figure 7:
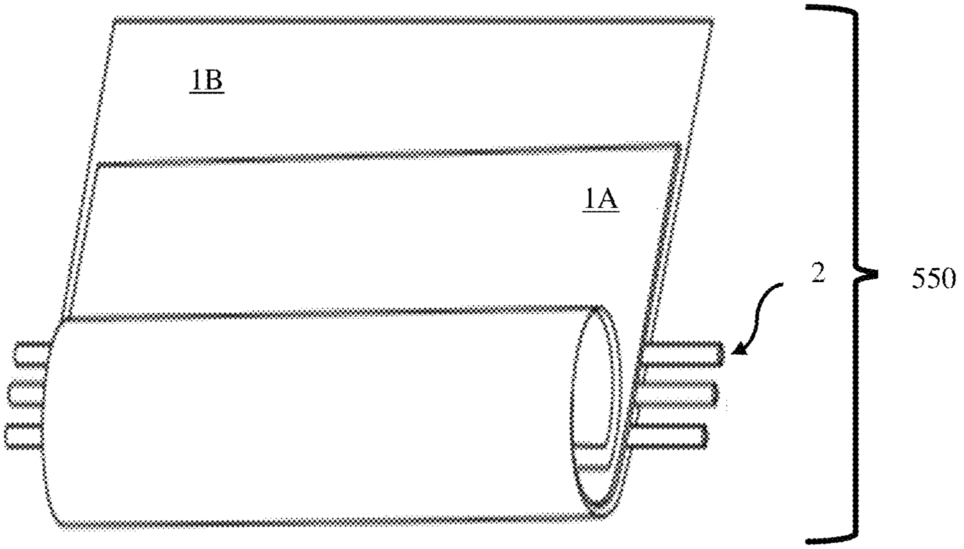
FIGS. 7-9 depict examples of a flexible cover manufactured in certain implementations of the present application according to the method depicted in FIG. 4.

FIG. 7 depicts an example of a flexible covering 550 manufactured in certain implementations of the present application according to the method depicted in FIG. 4. For example, the least one first cover layer 1A and at least one second cover layer 1B may be connected to form a cover 1 having a rolled shape capable of encasing or wrapping at least one object, such as a grouping of wires or cables. At the same time, the cover 1 may at least partially encapsulate the pliable insert 2 and orient the pliable insert 2, such as to position one or more rods or wires of the pliable insert to extend in a direction intersecting the rolled direction of the cover 1.

Figure 8:
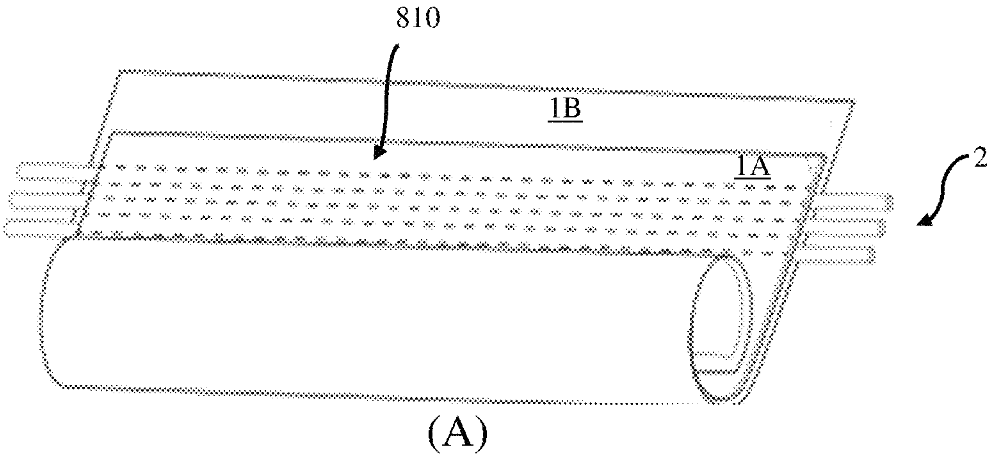
Figure 8:
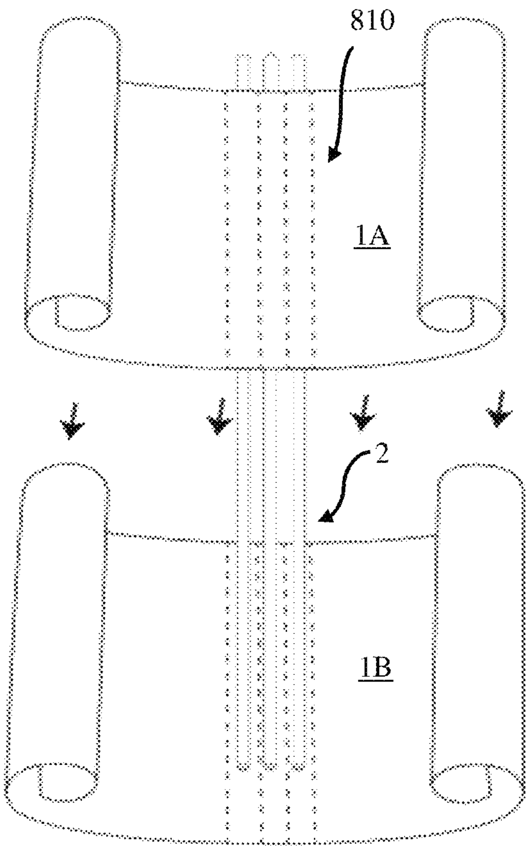

FIG. 8 depicts an example of a flexible covering 550 manufactured in certain implementations of the present application according to the method depicted in FIG. 4. As shown a section (A) of FIG. 8, the flexible covering 550 may include one or more seams provided to connect cover layers 1A, 1B, between sections of insert layer 2. For example, as depicted in section (B) of FIG. 8, a first portion of a connector, such as a hook portion of a hook-and-loop fastener, may be provided on a first cover layer 1A, and second portion of a connector, such as a hook portion of a hook-and-loop fastener, may be provided on a second cover layer 1B, and these first and second portions of the connector may be positioned to provide receiving pockets for portions of the pliable insert 2. Thus, the seams 810 may function to partially encapsulate the pliable insert 2. Furthermore, since the seams 810 may extend in a length direction of sections of the pliable insert 2, the seams may function to provide additional strength and rigidity of the flexible covering 550 in the length direction of the pliable insert 2, while allowing the flexible covering 550 to be more easily folded or unfolded in an opposite width direction of the pliable insert 2 to receive or release a held object, such as one or more wires.

Figure 9:
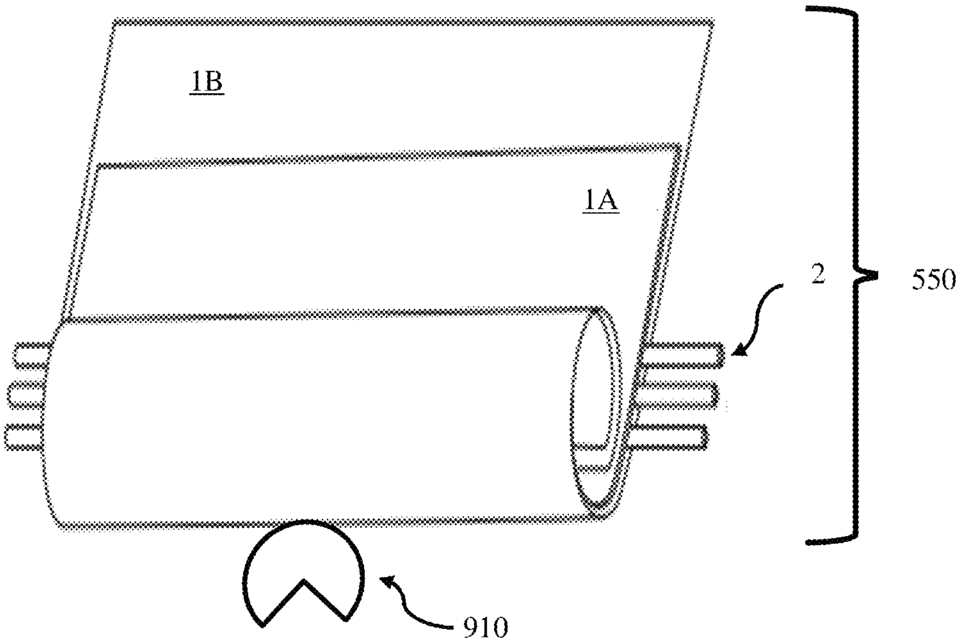

FIG. 9 depicts an example of a flexible covering 550 manufactured in certain implementations of the present application according to the method depicted in FIG. 4. For example, at least one an attachment device 910 may be coupled to the cover (step S440). In the depicted example, the attachment device 910 may be provided at an intermediate section of the flexible covering 550 to allow end sections of the flexible covering 550 and an object held therein to be bent and shaped as desired, while the attachment device 910 may be used to attach the bent the flexible covering 550 and held object to a desired location.

In certain examples, the attachment device 910 may be a clamp, brace, band, clasp, etc. that may be used to attach the flexible cover and an object held therein to another object, may be coupled to an outer surface of the outer cover layer. In another example, the attachment device 910 may include a fastener, such a nail or an adhesive that is used to couple the flexible covering 550 to a surface or other location. The attachment device 910 may be permanently attached to the flexible cover using an adhesive, sewing, bolt, connector, etc. or may be coupled together through a heating or chemical process to bond attachment device to the cover. Alternatively, the attachment device 910 may be removably coupled to the flexible covering 550 such as a hook-and-loop connector, a zipper, clasps, snap closures, or similar devices. Accordingly, flexible covering 550 may have the ability to be selectively coupled to various different attachment devices 910 or other accessories that can attach in the ends or middle sections, such as a stand, a vise, clips, extended grips, or other apparatus to enhance the utility of the device.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for forming a flexible covering comprising:
- providing at least one pliable insert;
- providing at least one first cover layer and at least one second cover layer on opposite sides of the at least one pliable insert; and
- coupling together the at least one first cover layer and the at least one second cover layer to form a flexible wrap having a prescribed length between first and second ends in a first direction,
- wherein a first edge of the flexible wrap overlaps a second edge of the flexible wrap in a first state,
- wherein the at least one pliable insert is at least partially positioned within the flexible wrap,
- wherein the at least one pliable insert is configured to maintain the flexible wrap in a bent state when the flexible wrap is folded in a second direction different from the first direction, and wherein the flexible wrap is capable of being unrolled into a second state, and
- wherein coupling together the at least one first cover layer and the at least one second cover layer includes:
  - providing a first seam section on the at least one first cover layer and a second seam section on the at least one second cover layer, and
  - coupling the first seam section and the second seam section to couple together the at least one first cover layer and the at least one second cover layer and to define at least one seam that is provided at one or more sides of the at least one pliable insert and that extends in a length direction of the at least one pliable insert, the at least one seam being configured to provide additional strength and rigidity of the flexible covering in the length direction of the at least one pliable insert and to allow the flexible covering to be folded or unfolded in a width direction of the at least one pliable insert to receive or release a held object.

2. The method of claim 1, wherein the at least one pliable insert includes at least one rod running along a length of the flexible wrap.

3. The method of claim 2, wherein the at least one rod is made of a metal.

4. The method of claim 3, wherein the at least one rod runs diagonally through the length of the flexible wrap.

5. The method of claim 1, wherein the at least one pliable insert includes a pliable mesh sheet that runs along at least a portion of the flexible wrap.

6. The method of claim 1, wherein the at least one pliable insert includes two or more pliable rods arranged in parallel along at least a portion of a length of the flexible wrap.

7. The method of claim 1, wherein at least one of the at least one first cover layer or the at least one second cover layer of the flexible wrap is made of a non-conducting rubber.

8. The method of claim 1, wherein at least one of the at least one first cover layer or the at least one second cover layer of the flexible wrap includes a mesh material.

9. The method of claim 1, wherein coupling together the at least one first cover layer and the at least one second cover layer includes connecting the at least one first cover layer and the at least one second cover layer using at least one of a hook-and-loop connector, a zipper, a clasp, or a snap closure after positioning the at least one pliable insert between the at least one first cover layer and the at least one second cover layer.

10. The method of claim 1, wherein coupling together the at least one first cover layer and the at least one second cover layer includes bonding together the at least one first cover layer and the at least one second cover layer.

11. The method of claim 1, wherein the first seam section and the second seam section are provided to form the at least one seam at an edge of a portion of the at least one pliable insert.

12. The method of claim 1, wherein the first seam section includes one of a hook portion or a loop portion of a hook-and-loop fastener, and the second seam section includes another one of the hook portion or the loop portion of the hook-and-loop fastener.

13. The method of claim 1, further comprising coupling a clamp to the flexible wrap.

14. The method of claim 13, wherein the clamp is removably coupled to the flexible wrap.

15. A flexible covering formed according to the method of claim 1.

16. The flexible covering of claim 15, wherein the at least one pliable insert includes at least one rod running along a length of the flexible wrap.

17. The flexible covering of claim 15, wherein at least one of the at least one first cover layer or the at least one second cover layer of the flexible wrap is made of a non-conducting rubber.

18. The flexible covering of claim 15, wherein at least one of the at least one first cover layer or the at least one second cover layer of the flexible wrap includes a mesh material.

19. The flexible covering of claim 15, further comprising a clamp coupled to at least one of the at least one first cover layer or the at least one second cover layer.

20. The flexible covering of claim 19, wherein the clamp is removably coupled to the at least one of the at least one first cover layer or the at least one second cover layer.

* * * * *